(12) United States Patent
Bober et al.

(10) Patent No.: US 12,476,946 B1
(45) Date of Patent: Nov. 18, 2025

(54) SECURING SENSITIVE DATA IN EDGE DEVICES USING STEGANOGRAPHY

(71) Applicant: Dell Products L.P., Round Rock, TX (US)

(72) Inventors: Roman Bober, Ashdod (IL); Stav Sapir, Beer Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 18/756,165

(22) Filed: Jun. 27, 2024

(51) Int. Cl.
 *H04L 9/40* (2022.01)
(52) U.S. Cl.
 CPC ................ *H04L 63/0428* (2013.01)
(58) Field of Classification Search
 CPC .................................................. H04L 63/0428
 USPC .......................................................... 713/153
 See application file for complete search history.

(56) References Cited

U.S. PATENT DOCUMENTS

| | | | |
|---|---|---|---|
| 11,178,116 B2* | 11/2021 | O'Hare | H04L 63/0876 |
| 11,861,039 B1* | 1/2024 | Pushkin | G06F 3/0619 |
| 11,899,671 B1* | 2/2024 | Mishra | G06N 3/098 |
| 2009/0132813 A1* | 5/2009 | Schibuk | G06Q 20/4014 726/9 |
| 2019/0191191 A1* | 6/2019 | Xu | H04N 21/232 |
| 2021/0160331 A1* | 5/2021 | Wang | H04L 67/51 |
| 2024/0386490 A1* | 11/2024 | Nasir | G06Q 40/03 |
| 2025/0245665 A1* | 7/2025 | Tholar | G06Q 20/4016 |

* cited by examiner

*Primary Examiner* — Amare F Tabor
(74) *Attorney, Agent, or Firm* — WOMBLE BOND DICKINSON (US) LLP

(57) ABSTRACT

Methods and systems for managing data in a deployment comprising edge devices are disclosed. The data may include sensitive data. The sensitive data may be managed by embedding the sensitive data in digital content data in a steganographic manner. After embedding the sensitive data, the digital content data may be transmitted between edge devices through a data stream. In the transmission of the digital content data, the sensitive data may be imperceptible to monitoring by an unauthorized third-party. Because the sensitive data may be imperceptible in the transmission, the edge devices may securely share the sensitive data. Because the edge devices may securely share the sensitive data, computer implemented services may be improved.

21 Claims, 7 Drawing Sheets

SECURING SENSITIVE DATA IN EDGE DEVICES USING STEGANOGRAPHY

Embodiments disclosed herein relate generally to managing data in a deployment comprising edge devices. More particularly, embodiments disclosed herein relate to securing sensitive data in the edge devices using steganography.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
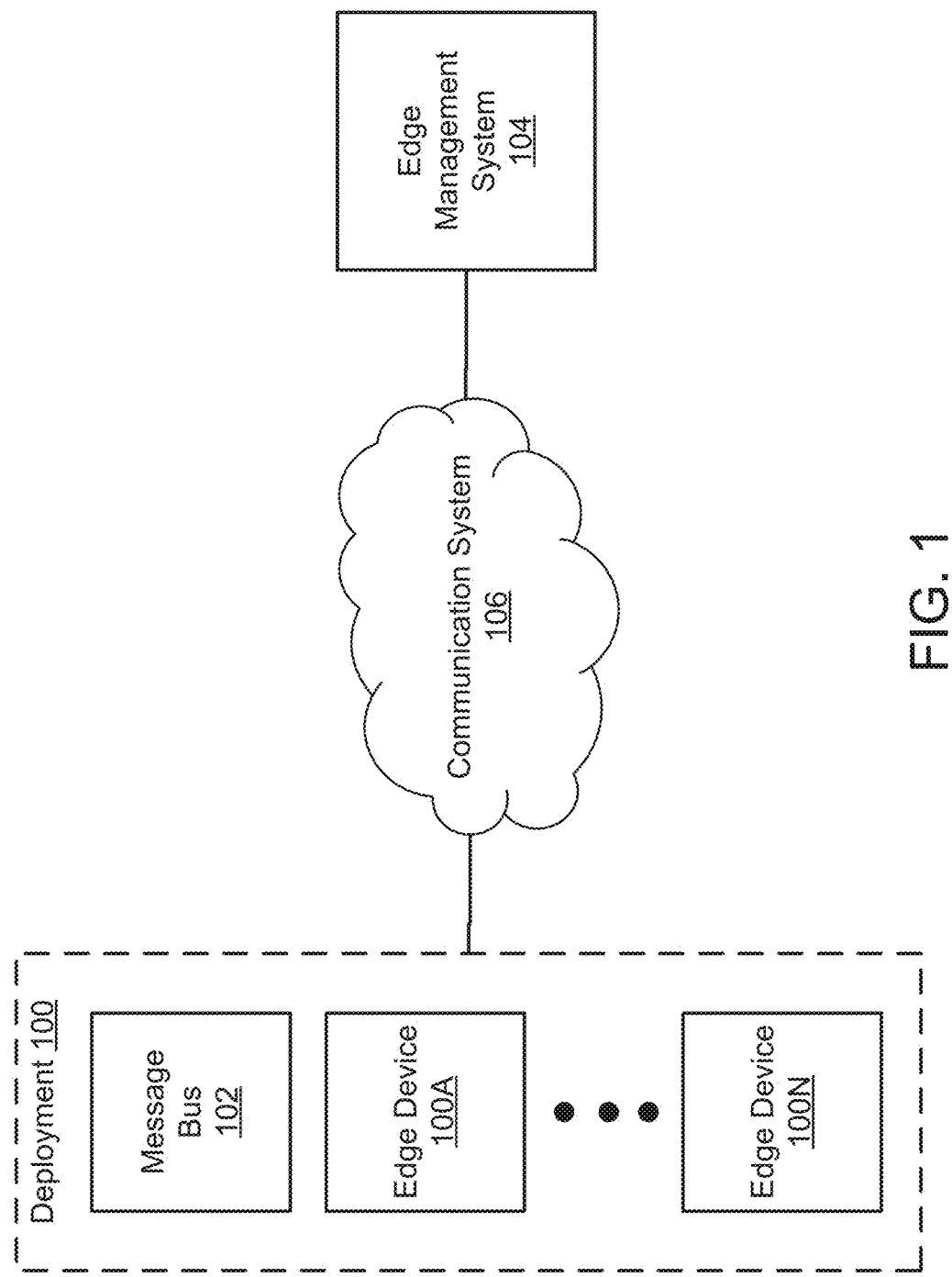
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data in a deployment comprising edge devices. The data may include sensitive data. The sensitive data may have a higher level of risk than other data that has a lower level of risk.

The sensitive data may be managed by securing the sensitive data for a transfer of the sensitive data between edge devices. The sensitive data may need to be transmitted between edge devices because a first edge device may need to perform operations with the sensitive data that may be present on a second edge device. The transmission may need to be secured because the sensitive data may be exposed in a data stream between the edge devices.

To secure the transfer of the sensitive data between edge devices, the sensitive data may be embedded in digital content data in a steganographic manner. The digital content data may include data in an image, audio, video, and/or word processing format. The sensitive data may be embedded by setting bits of a first binary code of the sensitive data in bit strings of a second binary code of the digital content data to generate second digital content data. Locations of the bits in the second digital content data may be recorded in embedding control data.

With the sensitive data being secured in the second digital content data, the second digital content data and the embedding control data may be transmitted from the first edge device through the data stream to the second edge device. Upon receiving the second digital content data and the embedding control data, the second edge device may use the embedding control data to extract the sensitive data from the second digital content data. Once the second edge device regenerates the sensitive data, the second edge device may perform operations with the sensitive data.

By embedding the sensitive data in the digital content data, the sensitive data may be imperceptible from monitoring of the data stream. By being imperceptible from monitoring of the data stream, the sensitive data may be secured while being transmitted between the edge devices. By being secured during the transmission between the edge devices, computer implemented services by the edge devices may be improved.

In an embodiment, a method for managing data in a deployment comprising edge devices is disclosed. The method may include (i) obtaining first data; (ii) making a first determination regarding whether the first data includes sensitive data, the sensitive data being ascribed a higher level of risk when compared to other data which is ascribed a lower level of risk; (iii) in a first instance of the first determination where the first data includes the sensitive data: (a) obtaining first chunks of the first data by chunking the first data; (b) obtaining second data; (c) embedding a second chunk of the first chunks of the first data inconspicuously in the second data so that a presence of the second chunk is not apparent in the second data; and (d) sending the second data to an edge device of the edge devices.

The method may further include wherein in the first instance of the first determination where the first data does not include sensitive data: continuing to provide computer implemented services with the first data.

The method may further include, after the second data is sent: (i) receiving third data from a second edge device of the edge devices, the third data comprising a third chunk from fourth chunks of fourth data, the third chunk embedded inconspicuously in the third data so that the third chunk is not apparent in the third data; (ii) extracting the third chunk from the fourth chunks of fourth data; and (iii) obtaining the fourth data by combining the third chunk with the fourth chunks.

Embedding the second chunk of the first chunks of the first data inconspicuously may include: (i) combining the second chunk with the second data in a steganographic manner so that, upon inspection of the second data, the second chunk is concealed, and (ii) generating a stego key to direct the embedding of the second chunk in the second data and record locations of bits of a first binary code of the second chunk in a second binary code of the second data.

The second data includes metadata that inaccurately describes the second chunk to conceal the second chunk within the second data.

The metadata indicates that the second chunk relates to information conveyed by the second data prior to the combining of the second chunk with the second data rather than relating to the sensitive data.

The second data is digital content data that includes an image, audio, video, or word processing format.

The second chunk is encrypted using a cryptographic method that uses public key encryption and requires a private key to decrypt the second chunk.

Sending the second data to the edge device of the edge devices includes transmitting the second data in a data stream commonly sent between the edge device and a second edge device, a portion of the data stream being used as a steganographic carrier.

Combining the second chunk with the second data in a steganographic manner includes (i) obtaining a first binary code from the second chunk by using a character encoding standard to convert text characters to first bit strings; (ii) obtaining a second binary code by converting first amplitudes in the second data to second bit strings, the second data including an audio data format; (iii) obtaining a third binary code by setting a bit of the first binary code to a least significant bit of the second binary code; and (iv) obtaining third data by converting the third binary code to second amplitudes in the audio data format.

Combining the second chunk with the second data in a steganographic manner includes (i) obtaining a first binary code from the second chunk by using a character encoding standard to convert text characters to bit strings; (ii) obtaining a second binary code by converting first pixels in the second data to second bit strings, the second data including an image data format; (iii) obtaining a third binary code by setting a bit of the first binary code to a least significant bit of the second binary code; and (iv) obtaining third data by converting the third binary code to second pixels in the image data format.

Combining the second chunk with the second data in a steganographic manner includes (i) obtaining a first binary code from the second chunk by using a character encoding standard to convert first text characters to first bit strings; (ii) obtaining a second binary code from the second data by using the character encoding standard to convert second text characters to second bit strings, the second data including a word processing data format; (iii) obtaining a third binary code by setting a bit of the first binary code to a least significant bit of the second binary code; and (iv) obtaining third data by converting the third binary code into the word processing data format.

Combining the second chunk with the second data in a steganographic manner includes (i) obtaining a first binary code from the second chunk by using a character encoding standard to convert text characters to bit strings; (ii) obtaining first pixels from a first image of a first set of images of a first video to second bit strings, the second data including a video data format; (iii) obtaining a second binary code from the second data by using the character encoding standard to convert the first pixels to second bit strings; (iv) obtaining a third binary code by setting a bit of the first binary code to a least significant bit of the second binary code; (v) obtaining second pixels by converting third bit strings of the third binary code to integers; (vi) setting the second pixels in the first image of the first set of images to obtain a second set of the images; and (vii) obtaining third data by combining the second set of the images into the video data format.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, sensitive data may be sent from a first edge device of edge devices to a second edge device of the edge devices. The sensitive data may be sent by transmitting the data from the first edge device through a data stream to the second edge device. The first edge device and/or the second edge device may be deployed in a remote area, outside of a development environment.

Because the first edge device and/or the second edge device may be deployed in a remote area, the first edge device and/or the second edge device may risk exposure of the sensitive data. The exposure of the sensitive data may occur through the exposure of the data stream between the first edge device and/or the second edge device.

With the exposure of the data stream, the transmission may be monitored by an unauthorized third-party, such as a device and/or malicious software. If the unauthorized third-party monitors the transmission of the sensitive data, the unauthorized third-party may view and/or modify the sensitive data. If the unauthorized third-party views and/or modifies the sensitive data, then computer implemented services by the edge devices may be impacted.

In general, embodiments disclosed here relate to systems and methods for managing data in a deployment comprising edge devices. The data may be managed by (i) determining if the data includes sensitive data and (ii) performing steps to secure the sensitive data. If the data does not include sensitive data, then the edge devices may continue to perform computer implemented services.

However, if the data includes the sensitive data, the edge devices may perform the steps to secure a transmission of the data between a first edge device and a second edge device. To secure the transmission of the data, the steps performed by the first edge device may include (i) chunking the data into smaller portions of the data, (ii) embedding a chunk of the data into digital content data in a steganographic manner, and (iii) transferring the chunk of the data and embedding control data to a second device. The digital content data may be an image, audio, video, and/or word processing format.

Embedding the chunk of the data may include concealing the chunk of the data in the digital content file so that a presence of the chunk of the data is imperceptible. To conceal the chunk of the data, the portion of the data may be converted into a first binary code. Alongside the first chunk code, the digital content data may also be converted into a second binary code.

To conceal the first binary code in the second binary code in a steganographic manner, a bit of the first binary code may be set to a least significant bit in the second binary code to generate a third binary code. To record where the bit of the first binary code may be set, embedding control data may be generated. The embedding control data may hold a record of locations of bits from the first binary code that are set in the second binary code. Finally, the third binary code may be converted into second digital content data. Because least significant bits were modified in the digital content data, any difference between the digital content data and the second digital content data may be imperceptible.

The second digital content data and the embedding control data may be transmitted from the first edge device to a second edge device. The transmission may be facilitated by a message bus. The message bus may facilitate transfer of the second digital content data and the embedding control data in a data stream. The data stream may include other digital content data in which other sensitive data is embedded.

The second edge device may receive the second digital content data and the embedding control data. To acquire the sensitive data, the second edge device may extract the sensitive data. To extract the sensitive data, the second digital content data may be converted back into the third binary code. Using the embedding control data, the least significant bits that were set in the third binary code may be identified and extracted to generate the first binary code. The first binary code may then be converted into the sensitive data.

By embedding the sensitive data in digital content data and transmitting the digital content data and the embedding control data between the edge devices, a likelihood of exposure of the data by an unauthorized third-party may be minimized. By minimizing the likelihood of exposure of the data, the edge devices may continue to provide the computer implemented services.

To provide the above noted functionality, the system may include deployment 100 and edge management system 104. Each of these components is discussed below.

Deployment 100 may include message bus 102 and any number of edge devices 100A-100N. Edge devices 100A-100N may perform computer implemented services by securing a transmission of sensitive data. The transmission of the sensitive data may be secured by (i) chunking the data into smaller portions of the data, (ii) embedding a portion of the data into a digital content data in a steganographic manner, and (iii) transferring the sensitive data and embedding control data to an edge device of edge devices 100A-100N. Any edge device of edge devices 100A-100N may include a repository of digital content data in which to embed data before transferring the data.

Message bus 102 may facilitate transmission of the sensitive data. Message bus 102 may include any wired and/or wireless access points between edge devices 100A-100N. The wired and/or wireless access points may generate a data stream between edge devices 100A-100N that carries digital content data, any portion of which may have embedded data that includes sensitive data. Because an unauthorized third-party device can monitor the data stream, the data may be embedded inconspicuously in the digital content data so that a presence of the data may be imperceptible.

Edge management system 104 may oversee functionality and performance of any number of edge devices 100A-100N. Edge management system 104 may oversee the functionality and the performance by (i) updating software used by edge devices 100A-100N in chunking of the data, embedding the portion of the data in digital content data, and transferring the digital content data, (ii) monitoring health of edge devices 100A-100N, and/or (iii) providing digital content data to any number of edge devices 100A-100N in which to embed data. Edge management system 104 may also monitor message bus 102. To monitor message bus 102, edge management system 104 may (i) track transmission of the data through message bus 102, (ii) monitor all devices that monitor, send, and/or receive data using message bus 102, and (iii) record latency of the data stream provided by message bus 102.

While providing their functionality, any of deployment 100 and edge management system 104 may perform all, or a portion, of the flows and methods shown in FIGS. 2A-3C.

Any of (and/or components thereof) deployment 100 and edge management system 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1 as including a limited number of specific components, a system in accordance with an embodiment may include fewer, additional, and/or different components than those components illustrated therein.

Figure 2A:
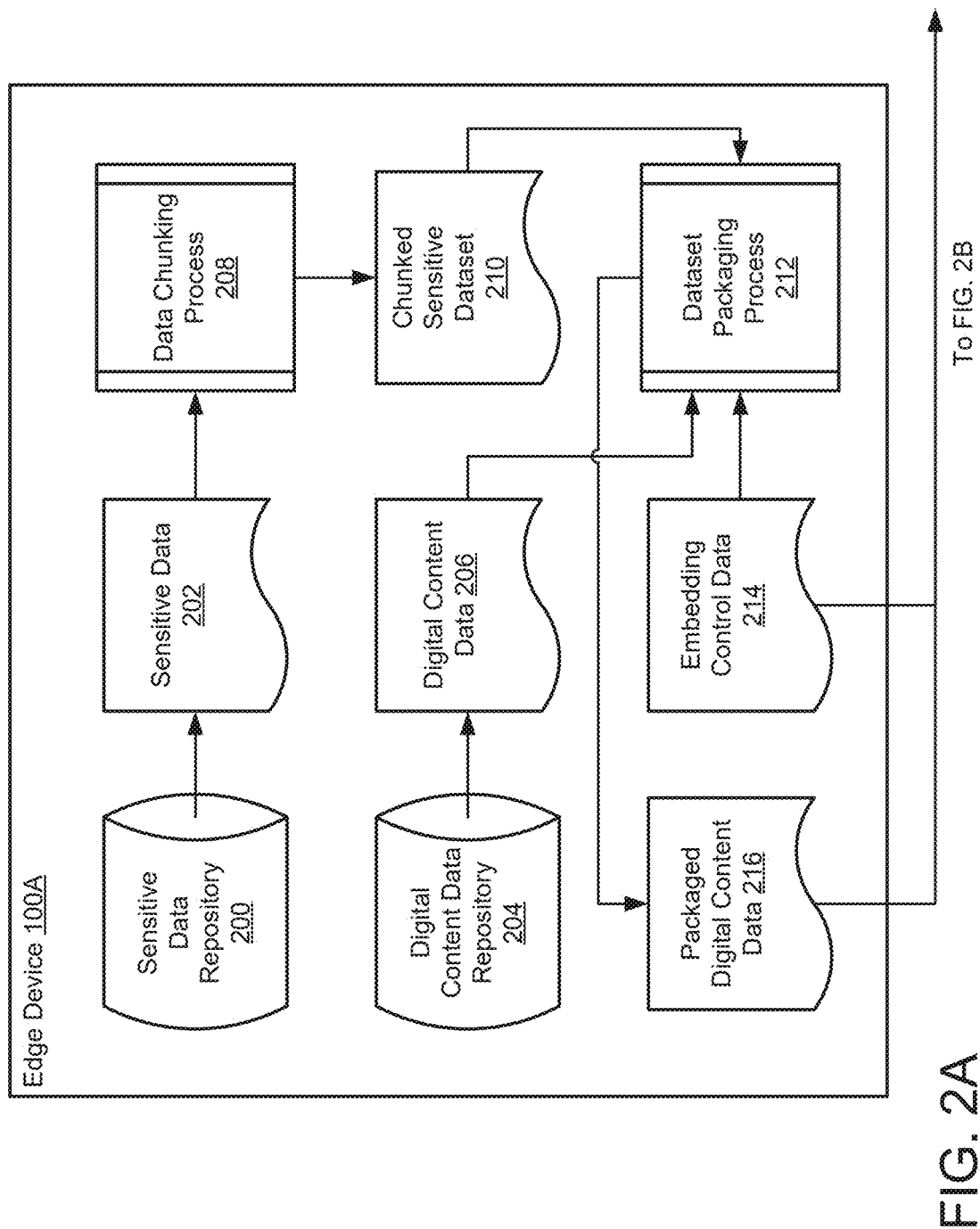
FIGS. 2A-2B show data flow diagrams illustrating operation of a system in accordance with an embodiment.
Figure 2B:
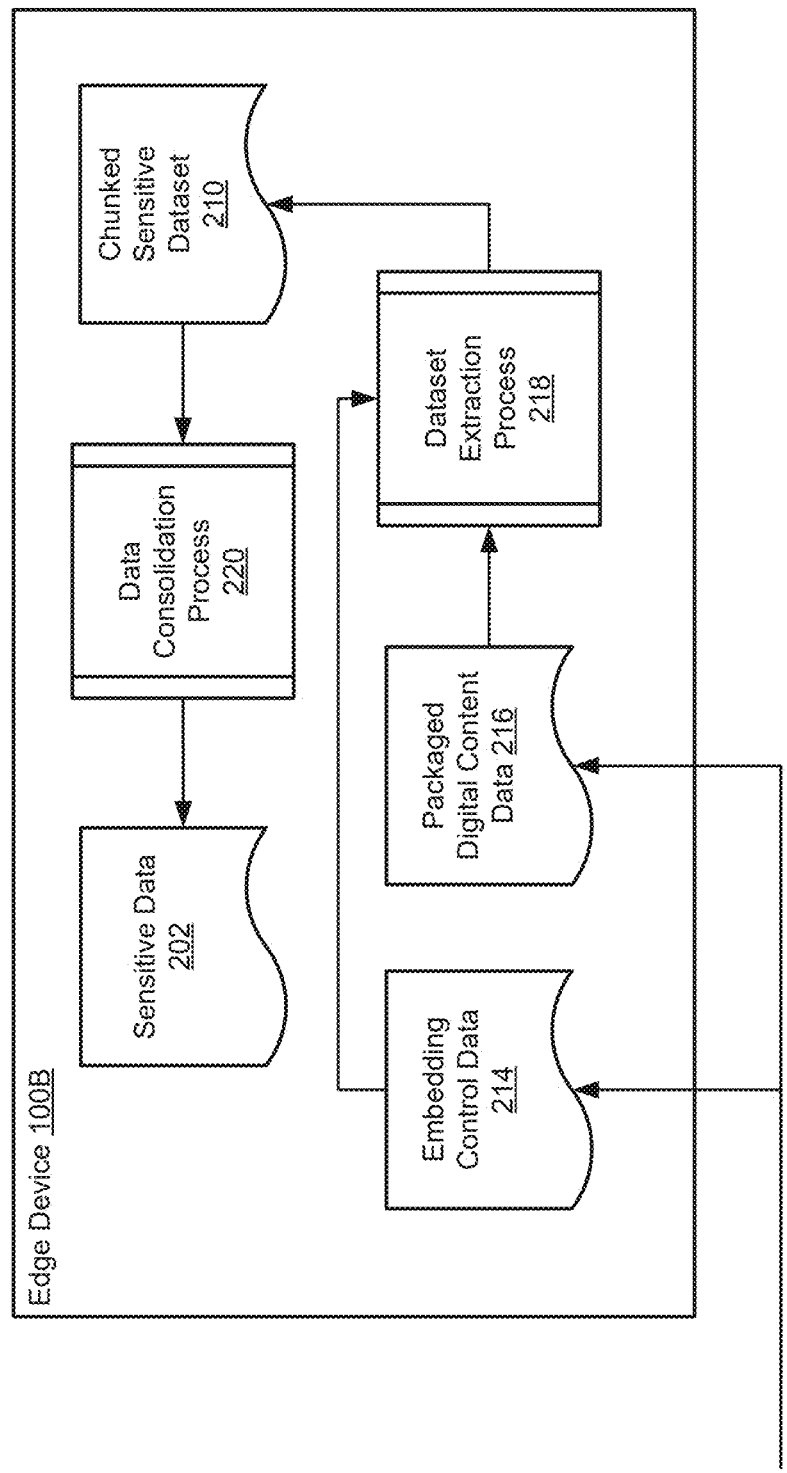

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 202, 206, etc.) is used to represent data structures, a second set of shapes (e.g., 208, 212, etc.) is used to represent processes performed using and/or that generate data, and a third set of shapes (e.g., 200, 204, etc.) is used to represent large scale data structures such as databases.

Turning to FIG. 2A, a first data flow diagram in accordance with an embodiment is shown. The first data flow diagram may illustrate data used in and data processing performed in sending digital content data and embedding control data from an edge device.

To send the digital content data and the embedding control data, data chunking process 208 may be performed. During data chunking process 208, sensitive data 202 may be extracted from sensitive data repository 200. Sensitive data 202 may include data that has a higher level of risk than other data that has a lower level of risk. The data may include personally identifiable information, health data, social security numbers, etc.

Sensitive data 202 may be extracted by selecting sensitive data 202 from sensitive data repository 200. A selection of sensitive data 202 may be based on a requirement for sensitive data by a second edge device.

To prepare sensitive data 202 for transmission to the second edge device, sensitive data 202 may be chunked.

Sensitive data 202 may be chunked by dividing sensitive data 202 into a set of files, each file of the set of files having a file storage size that is less than the file storage size of sensitive data 202.

To chunk sensitive data 202, sensitive data 202 may be ingested by a data chunking algorithm. Two common types of data chunking algorithms include fixed-sized chunking and variable-sized chunking. In fixed-sized chunking, data is split into chunks that have a set number of bytes in each chunk to make similarly sized chunks. Although fixed-size chunking is computationally less expansive to perform than variable-sized chunking, fixed-sized chunking does not perform well when a shift in the chunked data occurs. For example, if the data in sensitive data 202 is shifted by a byte at a beginning position of the data, subsequent shifts may occur in the chunked data. The subsequent shifts may cause data duplication in the chunked data.

As an alternative, variable-sized chunking may be used to chunk sensitive data 202. In variable-sized chunking, data is split into chunks that have variable sizes in each chunk. With variable-sized chunks, a shift in the beginning position of the data may not cause the subsequent shifts in the chunked data. The subsequent shifts may not exist in the chunked data because a size of a first chunk of the chunked data may be different than the size of a second chunk of the chunked data. Despite a use of variable sizes for the chunked data, variable-sized chunking may be more computationally expensive than fixed-sized chunking because variable-sized chunking requires determination of chunking sizes for data that will be chunked.

Using a data chunking algorithm, such as fixed-size chunking and/or variable sized-chunking, chunked sensitive dataset 210 may be generated. Chunked sensitive dataset 210 may be a chunk of a set of chunks from sensitive data 202. Chunked sensitive dataset 210 may also have a smaller file storage size than sensitive data 202.

To package chunked sensitive dataset 210 for transmission to the second edge device, dataset packaging process 212 may be performed. During dataset packaging process 212, digital content data 206 may be extracted from digital content data repository 204. Digital content data repository 204 may store a collection of digital content data that includes media formats such as images, audio, videos, word processing data, etc. Digital content data 206 may be extracted by being selected from digital content data repository 204.

Digital content data 206 may be selected to package chunked sensitive dataset 210 during dataset packaging process 212. To package chunked sensitive dataset 210, chunked sensitive dataset 210 may be embedded within digital content data 206 so that a presence of chunked sensitive dataset 210 may be imperceptible. To embed chunked sensitive dataset 210, chunked sensitive dataset 210 may be converted to a first binary code including a first set of bit strings. Also, digital content data 206 may be converted to a second binary code including a second set of bit strings.

Chunked sensitive dataset 210 may be converted to the first binary code and digital content data 206 may be converted to the second binary code by translating the data into binary numbers. For example, for an image data format, pixels of the images may be translated from integers into binary numbers using an encoding standard (ex. American Standard Code for Information Interchange). For an audio data format, amplitudes may be translated from integers and/or floating-point numbers into the binary numbers using the encoding standard. For a video data format, the pixels of images of a video may be translated from integers into the binary numbers using the encoding standard. Finally, for a word processing data format, text may be translated from text characters into the binary numbers using the encoding standard.

A third binary code may also be generated by setting a bit of the first set of the bit strings to a least significant bit of a bit string of the second set of the bit strings. The third binary code may include a third set of the bit strings in which some of the least significant bits are different than the least significant bits of the second binary code. Packaged digital content data 216 may be generated by converting the third binary code to a media format similar to that of digital content data 206.

Embedding control data 214 may also be generated during dataset packaging process 212. Embedding control data 214 may be generated by recording (i) an encryption method used to encrypt the chunk, if the chunk is encrypted (ii) a description of a media format for digital content data 206, (iii) locations of least significant bits that are modified in digital content data 206, and/or (iv) lengths of the bit strings for the first binary code of the chunk.

As an example, consider health data for an individual that needs to be sent from the edge device to a second edge device. As the health data includes sensitive information, the health data may be packaged according to dataset packaging process 212 to ensure that the health data is secured before sending to the second edge device.

First, the health data may be encrypted to generate encrypted health data. The health data may be encrypted using a hash algorithm and/or symmetric or asymmetric cryptography. chunked into a set of chunks. The encrypted health data may then be chunked using fixed-sized chunking or variable sized-chunking. A chunk of the chunks that is smaller in file size than the encrypted health data may be easier to embed in digital content data. Then, digital content data may be selected from digital content data repository 204. The digital content data may include an image of a cat.

To prepare for embedding of the chunk, the chunk may be converted into a first binary code. The chunk may be converted by using an encoding standard (ex. American Standard Code for Information Interchange) to convert the characters of text in the chunk to a first binary code. Then, the digital content data may be converted into a second binary code. The digital content data may be converted by using the encoding standard to convert the pixels from integers to a second binary code.

To embed the first binary code in the second binary code, a portion of the second binary code in which to embed the first binary code may be selected in a predefined and/or random manner. Using the portion of the second binary code, locations of least significant bits of bit strings of the second binary code at which to set a bit of bit strings of the first binary code may be selected in the predefined and/or the random manner. Using the locations, a bit of the first binary code may be set in the least significant bits of the bit strings in the second binary code. The media format of the digital content data, the portion of the second code, and the locations may be recorded in embedding control data.

By setting the bit of the bit strings of the first binary code in the least significant bits of the second binary code, a third binary code may be generated. The third binary code may be converted into the media format of the digital content data to generate a second image of the cat. The second image may be very similar to the image of the cat. However, between the second image of the cat and the image of the cat, a difference in a portion of the least significant bits of the pixels may be present and may be imperceptible when viewing the image of the cat and the second image of the cat. The difference may include an embedding of the chunk of the chunks of the health data in the pixels of the second image.

Embedding control data 214 and packaged digital content data 216 may be transferred to a second edge device using message bus 102. To transfer embedding control data 214 and packaged digital content data 216, edge management system 104 may be notified by the edge device of an upload of embedding control data 214 and packaged digital content data 216 to message bus 102. Edge management system 104 may also be notified of the second edge device to which embedding control data 214 and packaged digital content data 216 will be transferred. After notifications are made to edge management system 104, embedding control data 214 and packaged digital content data 216 may be sent by message bus 102 to the second edge device.

Thus, via the data flow illustrated in FIG. 2A, a system in accordance with an embodiment may secure sensitive data to reduce a likelihood of exposure of the sensitive data during transmission of the sensitive data between edge devices. By reducing the likelihood of exposure of the sensitive data during the transmission, the edge devices may improve provision of computer implemented services.

Turning to FIG. 2B, a second data flow diagram in accordance with an embodiment is shown. The second data flow diagram may illustrate data used in and data processing performed in acquiring sensitive data that is embedded in digital content data that is received by an edge device.

To acquire a chunk of the sensitive data that is embedded in the digital content data that is received by an edge device, data extraction process 218 may be performed. During data extraction process 218, embedding control data 214 and packaged digital content data 216 may be received by the edge device and from message bus 102. The chunk of the sensitive data may be embedded within packaged digital content data 216. To extract the chunk of the sensitive data from packaged digital content data 216, packaged digital content data 216 may be converted from a media format to binary code. The digital content data may be converted by translating pixels, amplitudes, and/or text characters in packaged digital content data 216 into binary code. Refer to the description of FIG. 2A for more details concerning translating the pixels, the amplitudes, and/or the text characters into the binary code.

From the binary code, bits may be extracted. The bits may be extracted by selecting the bits from the binary code. Embedding control data 214 may be used during data extraction process 218 to facilitate extraction of the binary code for the chunk of the sensitive data. As locations of the bits and/or lengths of the bit strings may be recorded in embedding control data 214, embedding control data 214 may be used to search for the bits and write the bit strings to generate the binary code for the chunk of the sensitive data.

Once the binary code has been generated, chunked sensitive dataset 210 may be generated by converting the binary code into the chunk of the sensitive data. The binary code may be converted by using an encoding standard (ex. American Standard Code for Information Interchange) to convert the bits into text characters and/or integers in the chunk.

For example, embedding control data 214 and packaged digital content data 216 may be received by the edge device. Packaged digital content data 216 may include the chunk of the sensitive data embedded in an image of a cat. Upon receiving packaged digital content data 216, embedding control data 214 may be used to identify the locations of the bits in the image of the cat. With the locations of the bits, the bits may be extracted from the image of the cat. Embedding control data 214 may also include lengths of the bit strings. With the lengths of the bit strings, the bits may be organized into bit strings. With the bit strings, binary code for the chunk of the sensitive data may be generated. The binary code may be converted to the chunk of the data by using an encoding standard (ex. American Standard Code for Information Interchange) to convert the bits into the text characters and/or the integers in the chunk.

Having generated chunked sensitive dataset 210, data consolidation process 220 may be performed. During data consolidation process 220, chunked sensitive dataset 210 may be combined with other chunks of the sensitive data. Chunked sensitive dataset 210 may be combined by (i) ingesting chunked sensitive dataset 210 with the other chunks of the sensitive data into memory and (ii) generating the sensitive data 202 from the memory.

Thus, via the data flow illustrated in FIG. 2B, a system in accordance with an embodiment may regenerate sensitive data that was embedded in digital content data. By regenerating the sensitive data, the edge devices may improve a provision of computer implemented services.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
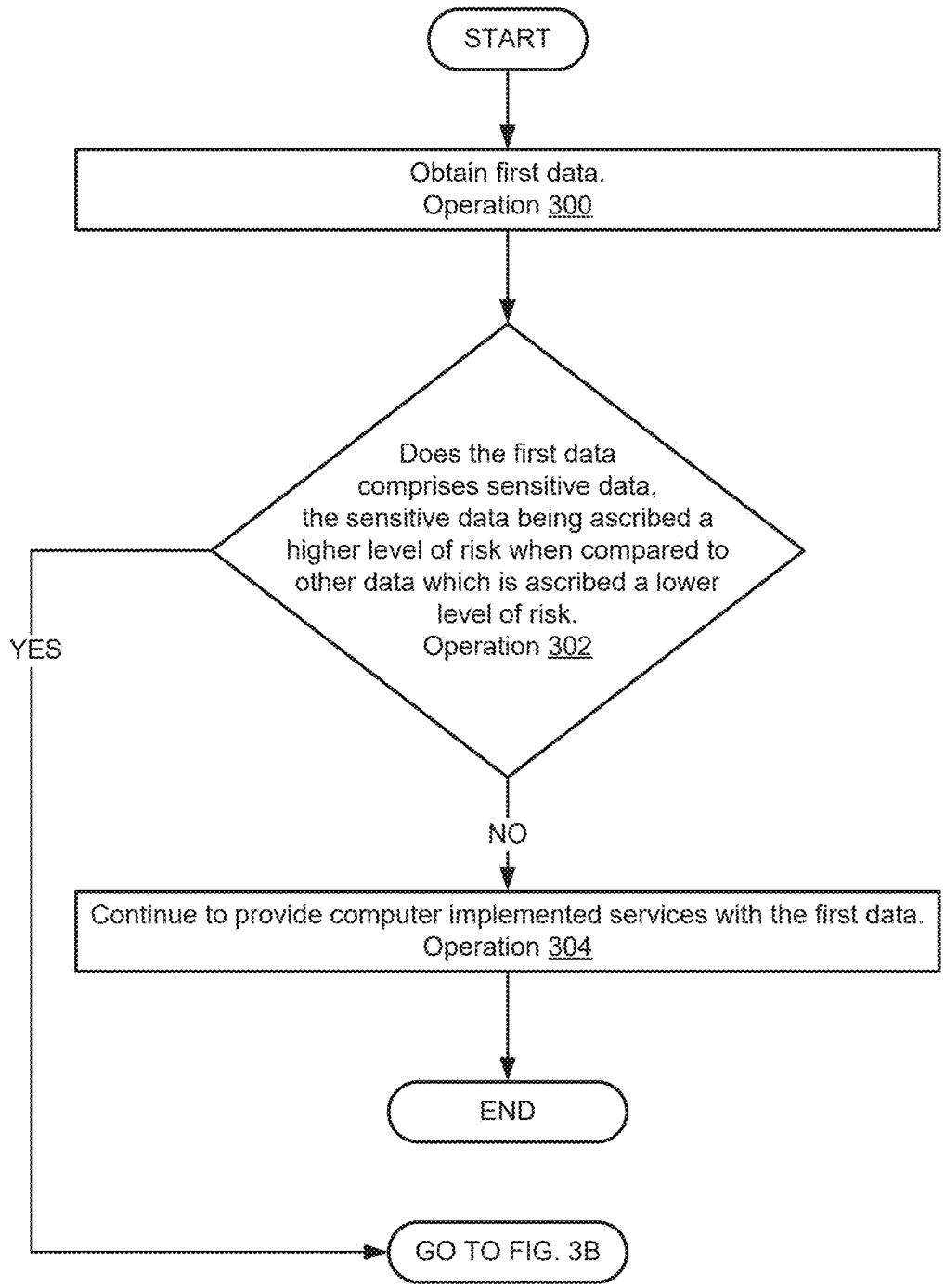
FIGS. 3A-3C show flow diagrams illustrating a method in accordance with an embodiment.
Figure 3B:
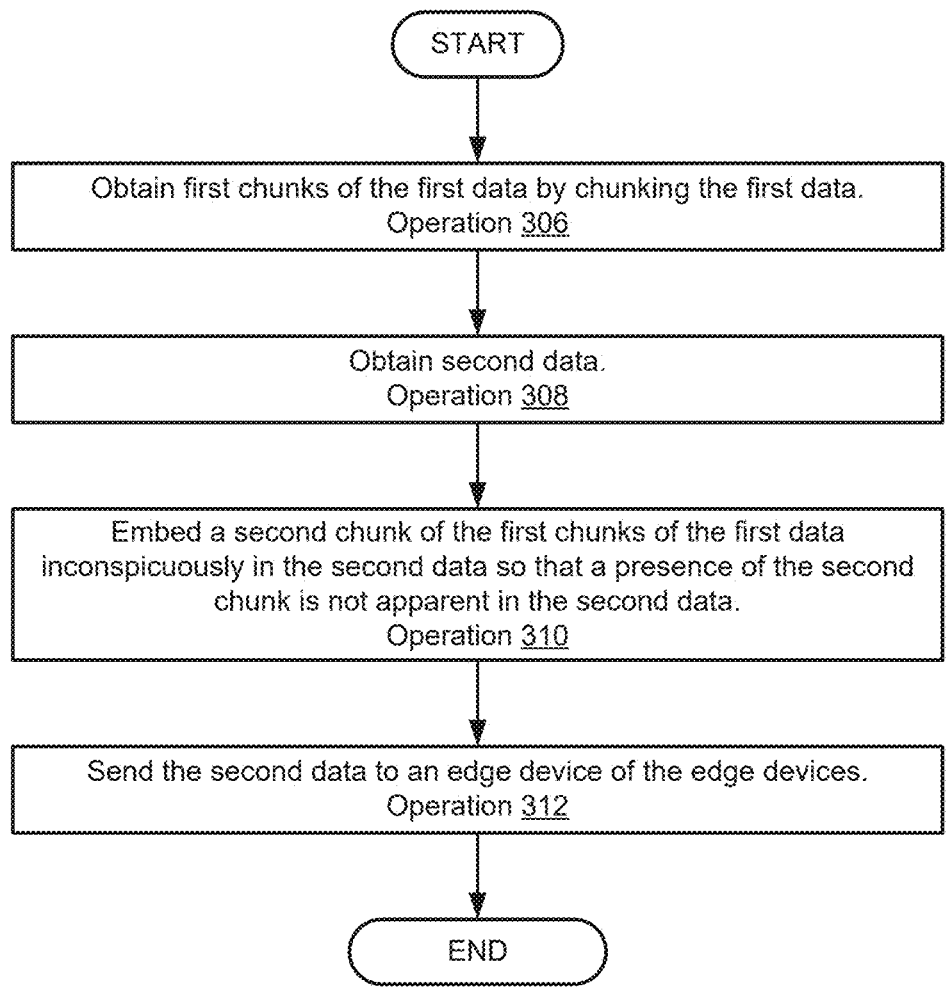
Figure 3C:
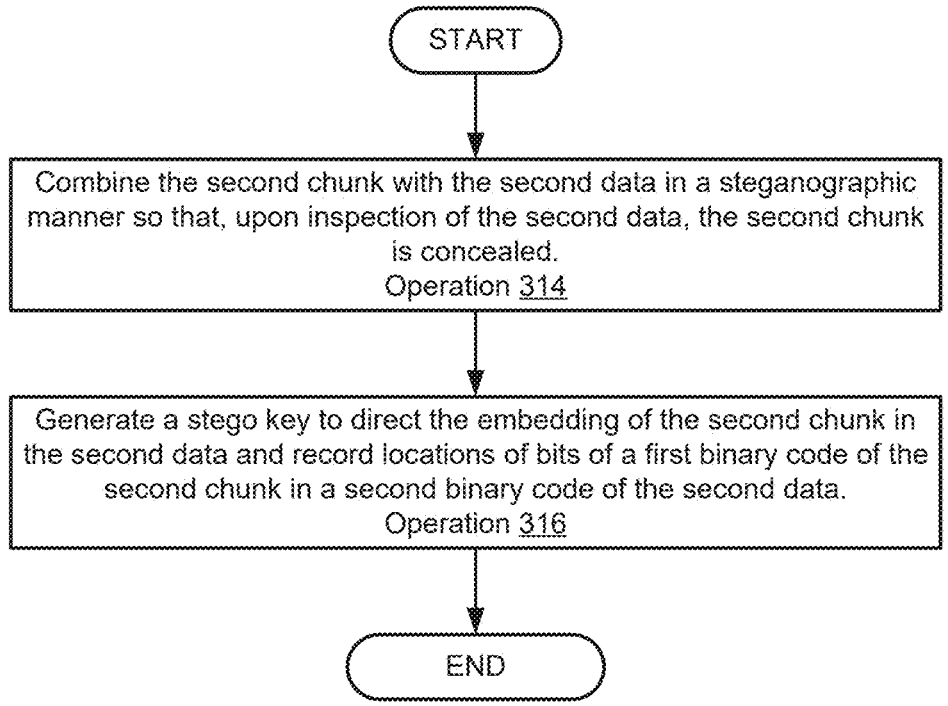

As discussed above, the components of FIG. 1 may perform various methods to manage power consumption by data processing systems. FIGS. 3A-3C illustrate a method that may be performed by the components of the system of FIG. 1. In the diagram discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of managing data in a deployment comprising edge devices in accordance with an embodiment is shown. The method may be performed, for example, by any of the components of the system of FIG. 1, and/or other components not shown therein.

At operation 300, first data may be obtained. The first data may be obtained by extracting the first data from a first repository.

At operation 302, a determination may be made whether the first data comprises sensitive data, the sensitive data being ascribed a higher level of risk when compared to other data that is ascribed a lower level of risk. The determination may be made by (i) identifying contents of the first data and (ii) assessing a level of risk based on the contents of the first data.

If the first data is determined to include the sensitive data, then the method may continue at operation 306. Otherwise, if the first data is determined not to comprise the sensitive data, then the method may continue at operation 304.

From operation 302, at operation 304, computer implemented services may continue to be provided by the first data. Computer implemented services may continue to be provided performing operations using the first data, the first data being ascribed a lower level of risk.

The method may end following operation 304.

From operation 302, turning to FIG. 3B, at operation 306, first chunks of the first data may be obtained by chunking the first data. The first data may be chunked by splitting the first data into the first chunks, a chunk of the first chunks having a smaller file storage size than the first data.

At operation 308, second data may be obtained. The second data may be obtained by extracting the second data from a second repository.

At operation 310, a second chunk of the first chunks of the first data may be inconspicuously embedded in the second data so that a presence of the second chunk is not apparent in the second data. Refer to FIG. 3C for details on how the second chunk of the first chunks of the first data may be inconspicuously embedded.

At operation 312, the second data may be sent to an edge device of the edge devices. The second data may be sent by transmitting the second data in a data stream commonly sent between the edge device and a second edge device, a portion of the data stream being used as a steganographic carrier. The second data may be transmitted by (i) notifying the edge device using an edge management system that second data is being sent and (ii) set the second data in a queue associated with the data stream to permit transmission of the second data.

The method may end following operation 312.

Turning to FIG. 3C, at operation 314, the second chunk may be combined with the second data in a steganographic manner so that, upon inspection of the second data, the second chunk is concealed. The second chunk may be combined by (i) obtaining a first binary code from the second chunk by using a character encoding standard to convert text characters to first bit strings; (ii) obtaining a second binary code by converting first amplitudes in the second data to second bit strings, the second data including an audio data format; (iii) obtaining a third binary code by setting a bit of the first binary code to a least significant bit of the second binary code; and (iv) obtaining third data by converting the third binary code to second amplitudes in the audio data format.

The first binary code from the second chunk may be obtained by translating the text characters into the first bit strings with the character encoding standard (ex. American Standard Code for Information Interchange). The second binary code may be obtained by translating the first amplitudes from integers and/or floating-point numbers into the second bit strings with the character the encoding standard. The third binary code may be obtained by replacing the bit of the first binary code with the least significant bit of the second binary code to make third bit strings. The third data may be obtained by translating the third bit strings from bit strings to the integers and/or floating-point numbers with the character encoding standard.

In a second example of operation 314, the second chunk may be combined with the second data in a steganographic manner so that, upon inspection of the second data, the second chunk is concealed. The second chunk may be combined by (i) obtaining a first binary code from the second chunk by using a character encoding standard to convert text characters to bit strings; (ii) obtaining a second binary code by converting first pixels in the second data to second bit strings, the second data including an image data format; (iii) obtaining a third binary code by setting a bit of the first binary code to a least significant bit of the second binary code; and (iv) obtaining third data by converting the third binary code to second pixels in the image data format.

The first binary code from the second chunk may be obtained by translating the text characters into the first bit strings with the character encoding standard (ex. American Standard Code for Information Interchange). The second binary code may be obtained by translating the first pixels of the second data from integers into the second bit strings with the character encoding standard. The third binary code may be obtained by replacing the bit of the first binary code with the least significant bit of the second binary code to make third bit strings. The third data may be obtained by translating the third bit strings from bit strings to the integers to generate second pixels with the character encoding standard.

In a third example of operation 314, the second chunk may be combined with the second data in a steganographic manner so that, upon inspection of the second data, the second chunk is concealed. The second chunk may be combined by (i) obtaining a first binary code from the second chunk by using a character encoding standard to convert first text characters to first bit strings; (ii) obtaining a second binary code from the second data by using the character encoding standard to convert second text characters to second bit strings, the second data including a word processing data format; (iii) obtaining a third binary code by setting a bit of the first binary code to a least significant bit of the second binary code; and (iv) obtaining third data by converting the third binary code into the word processing data format.

The first binary code from the second chunk may be obtained by translating the text characters into the first bit strings with the character encoding standard (ex. American Standard Code for Information Interchange). The second binary code may be obtained by translating second text characters of the second data from text into the second bit strings with the character encoding standard. The third binary code may be obtained by replacing the bit of the first binary code with the least significant bit of the second binary code to make third bit strings. The third data may be obtained by translating the third bit strings from bit strings to third text characters with the character encoding standard to generate the word processing data format.

In a fourth example of operation 314, the second chunk may be combined with the second data in a steganographic manner so that, upon inspection of the second data, the second chunk is concealed. The second chunk may be combined by (i) obtaining a first binary code from the second chunk by using a character encoding standard to convert text characters to bit strings; (ii) obtaining first pixels from a first image of a first set of images of a first video to second bit strings, the second data including a video data format; (iii) obtaining a second binary code from the second data by using the character encoding standard to convert the first pixels to second bit strings; (iv) obtaining a third binary code by setting a bit of the first binary code to a least significant bit of the second binary code; (v) obtaining second pixels by converting third bit strings of the third binary code to integers; (vi) setting the second pixels in the first image of the first set of images to obtain a second set of the images; and (vii) obtaining third data by combining the second set of the images into the video data format.

The first binary code from the second chunk may be obtained by translating the text characters into the first bit strings with the character encoding standard (ex. American Standard Code for Information Interchange). The first pixels may be obtained by (i) splitting the first video into the first set of the images, each image of the first set of the images being split at a specified number of the images per second in the first video, and (ii) selecting the first image from the first set of the images. The second binary code may be obtained by translating the first pixels from integers into the second bit strings with the character encoding standard. The third binary code may be obtained by replacing the bit of the first binary code with the least significant bit of the second binary code to make third bit strings. The second pixels may be obtained by translating the third bit strings from bit strings to the integers with the character encoding standard. The second pixels may be set in the first image of the first set of images by replacing the first pixels with the second pixels. With the second pixels in the first image of the first set of images, the second set of the images may be obtained. The third data may be obtained by combining the second set of the images using software that generates a video from the second set of the images.

Thus, via the method shown in FIGS. 3A-3C, embodiments herein may likely improve a likelihood of securing transmission of sensitive data to an edge device. By improving the likelihood of securing transmission of the sensitive data to an edge device, the edge devices may be more likely to provide desirable computer implemented services by, for example, preventing unauthorized access to sensitive data, adhering to security standards for the sensitive data, etc.

Figure 4:
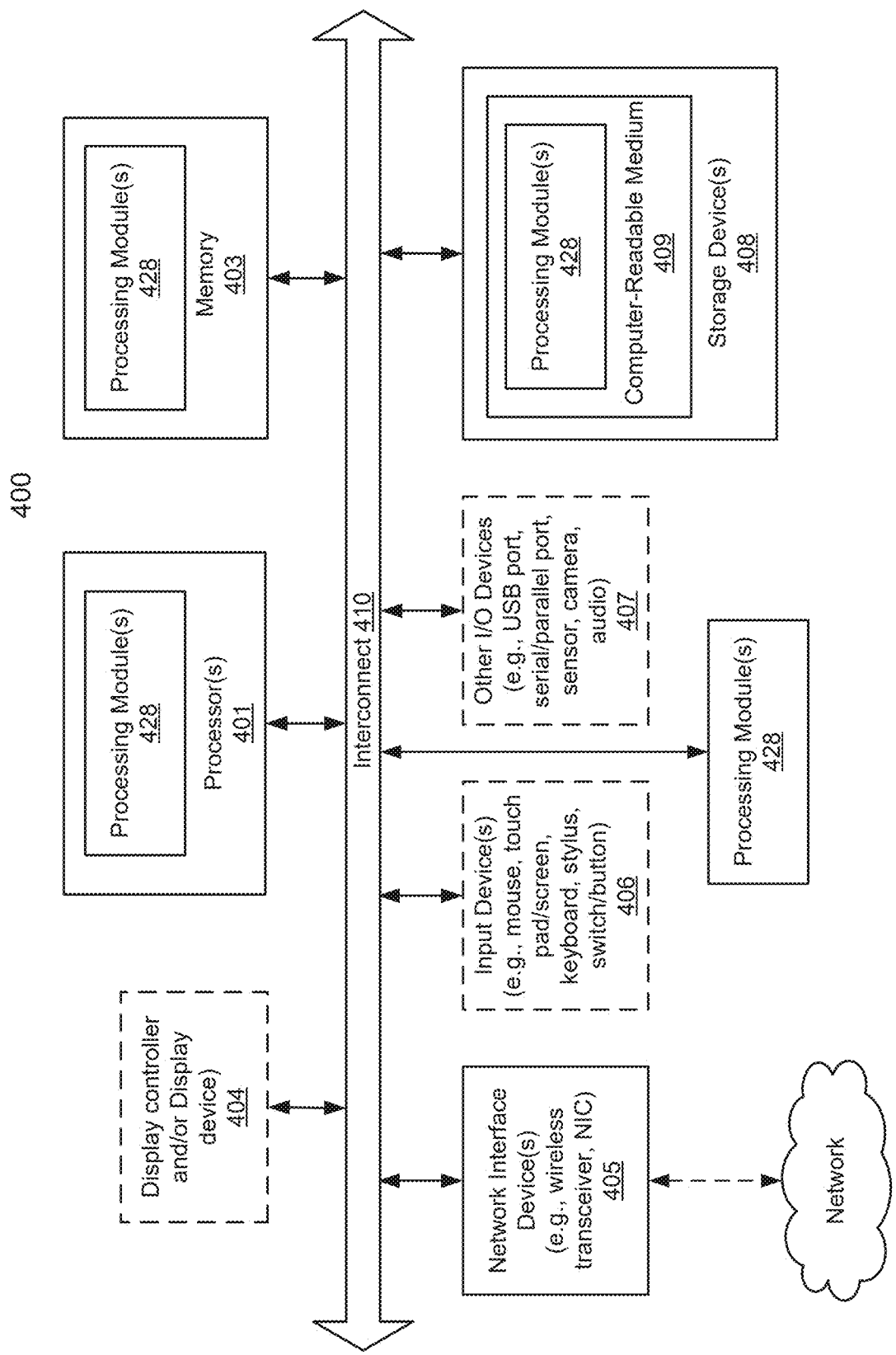
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above.

Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data in a deployment comprising edge devices, the method comprising:
   obtaining first data;
   making a first determination regarding whether the first data comprises sensitive data, the sensitive data being ascribed a higher level of risk when compared to other data which is ascribed a lower level of risk;
   in a first instance of the first determination where the first data comprises the sensitive data:
      obtaining first chunks of the first data by chunking the first data;
      obtaining second data;
      embedding a second chunk of the first chunks of the first data inconspicuously in the second data so that a presence of the second chunk is not apparent in the second data by at least:
         combining the second chunk with the second data in a steganographic manner so that, upon inspection of the second data, the second chunk is concealed, and
         generating a stego key to direct the embedding of the second chunk in the second data and record locations of bits of a first binary code of the second chunk in a second binary code of the second data; and
      sending the second data to an edge device of the edge devices.

2. The method of claim 1, further comprising:
   in the first instance of the first determination where the first data does not comprise sensitive data:
      continuing to provide computer implemented services with the first data.

3. The method of claim 1, further comprising:
   after the second data is sent:
      receiving third data from a second edge device of the edge devices, the third data comprising a third chunk from fourth chunks of fourth data, the third chunk embedded inconspicuously in the third data so that the third chunk is not apparent in the third data;
      extracting the third chunk from the fourth chunks of fourth data; and
      obtaining the fourth data by combining the third chunk with the fourth chunks.

4. The method of claim 1, wherein the second data comprises metadata that inaccurately describes the second chunk to conceal the second chunk within the second data.

5. The method of claim 4, wherein the metadata indicates that the second chunk relates to information conveyed by the second data prior to the combining of the second chunk with the second data rather than relating to the sensitive data.

6. The method of claim 1, wherein the second data is digital content data that comprises an image, audio, video, or word processing format.

7. The method of claim 1, wherein the second chunk is encrypted using a cryptographic method that uses public key encryption and requires a private key to decrypt the second chunk.

8. The method of claim 1, wherein combining the second chunk with the second data in a steganographic manner comprises:
   obtaining a first binary code from the second chunk by using a character encoding standard to convert text characters to first bit strings;
   obtaining a second binary code by converting first amplitudes in the second data to second bit strings, the second data including an audio data format;
   obtaining a third binary code by setting a bit of the first binary code to a least significant bit of the second binary code; and
   obtaining third data by converting the third binary code to second amplitudes in the audio data format.

9. The method of claim 1, wherein combining the second chunk with the second data in a steganographic manner comprises:
   obtaining a first binary code from the second chunk by using a character encoding standard to convert text characters to bit strings;
   obtaining a second binary code by converting first pixels in the second data to second bit strings, the second data including an image data format;
   obtaining a third binary code by setting a bit of the first binary code to a least significant bit of the second binary code; and
   obtaining third data by converting the third binary code to second pixels in the image data format.

10. The method of claim 1, wherein combining the second chunk with the second data in a steganographic manner comprises:
   obtaining a first binary code from the second chunk by using a character encoding standard to convert first text characters to first bit strings;
   obtaining a second binary code from the second data by using the character encoding standard to convert second text characters to second bit strings, the second data including a word processing data format;
   obtaining a third binary code by setting a bit of the first binary code to a least significant bit of the second binary code; and obtaining third data by converting the third binary code into the word processing data format.

11. The method of claim 1, wherein combining the second chunk with the second data in a steganographic manner comprises:
obtaining a first binary code from the second chunk by using a character encoding standard to convert text characters to bit strings;
obtaining first pixels from a first image of a first set of images of a first video to second bit strings, the second data including a video data format;
obtaining a second binary code from the second data by using the character encoding standard to convert the first pixels to second bit strings;
obtaining a third binary code by setting a bit of the first binary code to a least significant bit of the second binary code;
obtaining second pixels by converting third bit strings of the third binary code to integers;
setting the second pixels in the first image of the first set of images to obtain a second set of the images; and
obtaining third data by combining the second set of the images into the video data format.

12. The method of claim 1, wherein sending the second data to the edge device of the edge devices comprises:
transmitting the second data in a data stream commonly sent between the edge device and a second edge device, a portion of the data stream being used as a steganographic carrier.

13. A non-transitory machine-readable medium having instructions stored therein, which when executed by a processor, cause the processor to perform operations for managing data in a deployment comprising edge devices, the operations comprising:
obtaining first data;
making a first determination regarding whether the first data comprises sensitive data, the sensitive data being ascribed a higher level of risk when compared to other data which is ascribed a lower level of risk;
in a first instance of the first determination where the first data comprises the sensitive data:
obtaining first chunks of the first data by chunking the first data;
obtaining second data;
embedding a second chunk of the first chunks of the first data inconspicuously in the second data so that a presence of the second chunk is not apparent in the second data by at least:
combining the second chunk with the second data in a steganographic manner so that, upon inspection of the second data, the second chunk is concealed, and
generating a stego key to direct the embedding of the second chunk in the second data and record locations of bits of a first binary code of the second chunk in a second binary code of the second data; and
sending the second data to an edge device of the edge devices.

14. The non-transitory machine-readable medium of claim 13, wherein the operations further comprise:
wherein in the first instance of the first determination where the first data does not comprise sensitive data:
continuing to provide computer implemented services with the first data.

15. The non-transitory machine-readable medium of claim 13, wherein the operations further comprise:
after the second data is sent:
receiving third data from a second edge device of the edge devices, the third data comprising a third chunk from fourth chunks of fourth data, the third chunk embedded inconspicuously in the third data so that the third chunk is not apparent in the third data;
extracting the third chunk from the fourth chunks of fourth data; and
obtaining the fourth data by combining the third chunk with the fourth chunks.

16. A data processing system, comprising:
a processor; and
a memory coupled to the processor to store instructions, which when executed by the processor, cause the processor to perform operations for managing data in a deployment comprising edge devices, the operations comprising:
obtaining first data;
making a first determination regarding whether the first data comprises sensitive data, the sensitive data being ascribed a higher level of risk when compared to other data which is ascribed a lower level of risk;
in a first instance of the first determination where the first data comprises the sensitive data:
obtaining first chunks of the first data by chunking the first data;
obtaining second data;
embedding a second chunk of the first chunks of the first data inconspicuously in the second data so that a presence of the second chunk is not apparent in the second data by at least:
combining the second chunk with the second data in a steganographic manner so that, upon inspection of the second data, the second chunk is concealed, and
generating a stego key to direct the embedding of the second chunk in the second data and record locations of bits of a first binary code of the second chunk in a second binary code of the second data; and
sending the second data to an edge device of the edge devices.

17. The data processing system of claim 16, wherein the operations further comprise:
wherein in the first instance of the first determination where the first data does not comprise sensitive data:
continuing to provide computer implemented services with the first data.

18. The data processing system of claim 16, wherein the operations further comprise:
after the second data is sent:
receiving third data from a second edge device of the edge devices, the third data comprising a third chunk from fourth chunks of fourth data, the third chunk embedded inconspicuously in the third data so that the third chunk is not apparent in the third data;
extracting the third chunk from the fourth chunks of fourth data; and
obtaining the fourth data by combining the third chunk with the fourth chunks.

19. The non-transitory machine-readable medium of claim 13, wherein the second data comprises metadata that inaccurately describes the second chunk to conceal the second chunk within the second data.

20. The non-transitory machine-readable medium of claim 19, wherein the metadata indicates that the second chunk relates to information conveyed by the second data prior to the combining of the second chunk with the second data rather than relating to the sensitive data.

21. The non-transitory machine-readable medium of claim 13, wherein the second data is digital content data that comprises an image, audio, video, or word processing format.

\* \* \* \* \*